W. H. JAMES.
WHEEL ATTACHMENT.
APPLICATION FILED AUG. 5, 1918.
1,298,952. Patented Apr. 1, 1919.
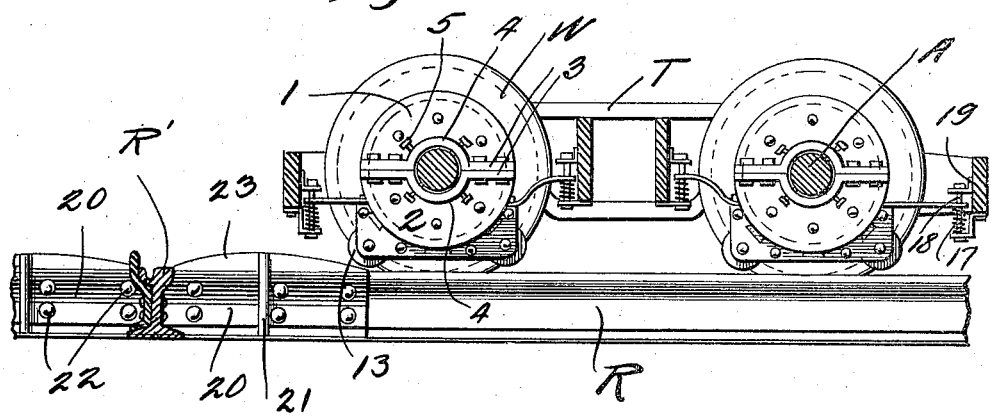
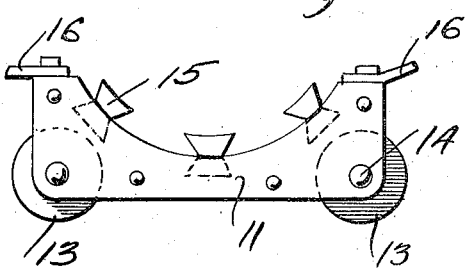
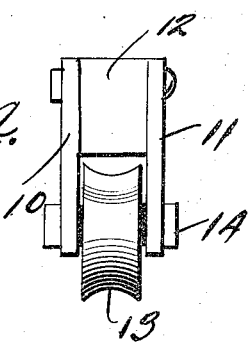

UNITED STATES PATENT OFFICE.

WILLIAM HENRY JAMES, OF PHILADELPHIA, PENNSYLVANIA.

WHEEL ATTACHMENT.

1,298,952. Specification of Letters Patent. Patented Apr. 1, 1919.

Application filed August 5, 1918. Serial No. 248,364.

*To all whom it may concern:*

Be it known that I, WILLIAM H. JAMES, a citizen of the United States, residing at Philadelphia, in the county of Philadelphia and State of Pennsylvania, have invented certain new and useful Improvements in Wheel Attachments, of which the following is a specification.

This invention relates to railway rolling stock, and more especially to wheels; and the object of the same is to produce an attachment for a car wheel capable of co-action with a supplemental rail applied to the ordinary rails where they abut or where they cross, whereby the main wheels will be lifted off the track and carried over such points so as to reduce noise and wear.

The invention embraces a supplemental tread of peculiar shape, and means for applying it to the axle inside the main wheel; a carriage hung by springs beneath said tread and normally out of contact therewith and adapted to be raised so as to engage said tread and lift the main wheel; and a supplemental rail of peculiar shape to co-act with the carriage. Details are set forth in the following specification and claims, and reference is made to the drawings attached and in which:—

Figure 1 is a section through a car truck and its axles and an elevation of two wheels thereof equipped with my invention, and this view also shows crossing rails equipped with my invention.

Fig. 2 is an enlarged vertical section through one of the wheels and its supplemental tread and through the main and supplemental rails co-acting therewith.

Fig. 3 is a side elevation of one of the carriages and

Fig. 4 is an end view of the same.

The rails R and the axles A, wheels W, and truck T may be of any appropriate construction. I will say at this point that my invention as described below is of such construction that it is applicable to old wheels and old rails already in use, but I leave it to the manufacturer and car builder to modify its construction when it is applied to wheels at the time they are made or applied to rails at the time they are made. Moreover the support which carries the carriage from the truck may have to be considerably modified according to the character of the truck.

Disposed against the inner side of the wheel W is what might be called a supplemental wheel, shown in Fig. 1 as made up of two halves 1 and 2 having mating flanges across their contiguous edges as shown at 3, arched over and beneath the axle A as at 4 on rather ample curves to accommodate the hub if the wheel W has one at the inside; and through these arches pass set screws 5 for centering the wheel as a whole around the axle. The periphery of this wheel is channeled as shown at 6, and its circumference is considerably less than that of the main wheel W. I would suggest that when this wheel is applied at the time the main wheel and its axle are made it could be formed of a single piece, or it is possible that it could be formed integrally upon the inner face of the main wheel, but as above stated these details are left to the maker.

In Figs. 3 and 4 is shown a carriage whereof one is provided for each supplemental wheel. Each carriage is composed of two side plates 10 and 11 and an intermediate or filler plate 12, all curved or dished on their upper edges as seen in Fig. 3 and otherwise of rectangular configuration. The corners of the filler are cut out to receive rollers 13 which are rotatably mounted therein on bolts 14 passing through the side plates 10 and 11, and the periphery of these rollers is dished as seen in Fig. 4. Set into appropriate notches in the dished upper face of the filler plate 12 are wear blocks 15 whose protruding upper ends overlie the dished upper edges of the side plates; and these blocks and the rollers are preferably of harder metal than the remainder of the structure. Arms 16 project forward and rearward from the carriage, and their outer ends are supported on springs 17 and movably mounted on upright rods 18 carried in brackets 19 attached to the truck C. The springs are of such tension and the parts are of such construction that the carriage is normally sustained with its rollers 13 off the tread of the rail R and its blocks 15 out of contact with the bottom of the channel 6 in the supplemental wheel 1; in other words the carriage is entirely idle while the car truck is traveling along the rail.

Applied to the inner side of the rail R at each crossing is a supplemental rail indicated broadly by the numeral 20, the same being of the section best shown in Fig. 2 and probably braced at suitable points as indicated at 21. Bolts 22 pass through this rail and the web of the main rail R for holding the parts together. The upper edge or tread of the supplemental rail stands flush with the tread of the main wheel at the ends of the supplemental rail as seen, and it curves upward intermediate its ends as best indicated at 23, being perhaps about an inch and a half above the tread of the main rail at its highest point. I apply these supplemental rails to the inner side of the main rails at a point of crossing, and may also use them where straight rails abut and have become worn. As seen in Fig. 1, there is a rail 20 at both sides of the crossing rail here indicated by the letter R'. The arrangement at right angles to that shown will correspond, but we are concerned only with what is illustrated in Fig. 1, assuming that the truck and its wheels are moving to the left.

With this construction of parts, the operation will be as follows: On approaching the crossing, the foremost roller 13 strikes and commences to rise. This raises the front end of the carriage 11 as its front support 16 and spring 17 permits, and it is quite possible that the rear end of the carriage will descend a little. The steel blocks 15 now rise within the lower side of the channel 6 and as the carriage progresses forward and the front roller, and eventually both rollers pass over the upper edge of the supplemental rail, the blocks 15 co-act with the supplemental tire or wheel as will be apparent. Just at the time that the carriage reaches the crossing rail R' its rollers 13 are at the highest points on the tracks 23, and the entire load at this end of the axle is sustained by the carriage while the tread of the main wheel W is lifted entirely off of the face of the rail R and it makes no contact whatever with the face of the crossing rail R'. Therefore rattle and wear is avoided, or in other words it is transferred to the carriage and the parts which are included in my invention and as these come into contact only at certain points, their wear will not be excessive. The passage of the main wheel over a crossing or past a defective rail-joint may therefore be said to be bridged, and I will hereinafter use this term as applying to the supplemental rails 20. I prefer rollers at the point 13 and blocks at the point 15, but do not wish to be limited in this respect. When the bridge rails 20 are applied to ordinary rails R at the time the latter are made, it is quite possible they could be formed or rolled integral with them, but as above suggested this will be left to the maker.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. An attachment for car wheels consisting of a supplemental wheel applied to the axle inside the main wheel; and a carriage underlying the supplemental wheel and dished on its upper edge to conform with the curvature thereof, and means for supporting said carriage from the car truck so as to be normally out of contact with the periphery of the supplemental wheel.

2. An attachment for car wheels consisting of a supplemental wheel applied to the axle inside the main wheel; and a carriage underlying the supplemental wheel and dished on its upper edge to conform with the curvature thereof, the periphery of the supplemental wheel being channeled, blocks inserted into the dished edge of said carriage and traveling in said channel, and yielding supports for the carriage, for the purpose set forth.

3. An attachment for car wheels consisting of a supplemental wheel applied to the axle inside the main wheel; and a carriage underlying the supplemental wheel and dished on its upper edge to conform with the curvature thereof, the periphery of the supplemental wheel being channeled, blocks inserted into the dished edge of said carriage and traveling in said channel, and yielding supports leading from the extremities of the carriage and connected with the car truck for sustaining the blocks within said channel but normally out of contact with the bottom of the same, for the purpose described.

4. An attachment for car wheels comprising a supplemental wheel applied to the axle inside the main wheel and channeled in its periphery, a carriage yieldingly supported beneath said supplemental wheel and having blocks projecting loosely into said channel, and rollers in the lower side of the carriage adapted to ride over a bridge mounted alongside the rail.

5. An attachment for car wheels comprising a supplemental wheel applied to the axle inside the main wheel and channeled in its periphery, a carriage dished in its upper edge and having blocks projecting into said channel, arms projecting forward and rearward from said carriage, upright rods carried by the car truck and on which said arms are loosely mounted, springs supporting the arms and of proper tension to hold the carriage with its blocks normally out of contact with the bottom of said channel, and rollers carried by the carriage and adapted to travel over a bridge rail applied to the side of the main rail.

6. An attachment for car wheels comprising a supplemental wheel applied to the inner side of the main wheel and centered around the axle, a carriage dished in its upper edge and underlying the supplemental wheel, arms projecting from its extremities, means for yieldingly supporting the arms from the car truck so as to hold the carriage normally out of contact with the supplemental wheel, and rollers in the lower side of the carriage adapted to strike a bridge rail applied along the side of the main rail.

7. In a device of the class described, the combination with a supplemental wheel mounted on a car axle, a carriage underlying the supplemental wheel, rollers in its lower side, and a yielding support holding the carriage normally out of contact with the supplemental wheel and the tread of the rail; of a bridge rail bolted to the inside of the main rail in the path of said rollers, its upper edge being curved upward between its extremities.

8. In a device of the class described, the combination with a supplemental wheel mounted on a car axle, a carriage underlying the supplemental wheel, rollers in its lower side, and a yielding support holding the carriage normally out of contact with the supplemental wheel and the tread of the rail; of a pair of bridge rails bolted to the inside of the main rail at opposite sides of another rail and each having its extremities flush with the tread of the main rail and its upper edge bowed upward between said extremities, for the purpose set forth.

In testimony whereof I affix my signature in presence of witnesses.

WILLIAM HENRY JAMES.

Witnesses:
FRANK K. BAXTER,
A. SCHICKLING,
WALTER LYNDE HUNTER.

Copies of this patent may be obtained for five cents each, by addressing the "Commissioner of Patents, Washington, D. C."